US008886982B2

(12) United States Patent
Kalman (10) Patent No.: US 8,886,982 B2
(45) Date of Patent: Nov. 11, 2014

(54) POWER SAVINGS USING DYNAMIC STORAGE CLUSTER MEMBERSHIP

(71) Applicant: NetApp, Inc., Sunnyvale, CA (US)

(72) Inventor: Dean Kalman, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/869,870

(22) Filed: Apr. 24, 2013

(65) Prior Publication Data

US 2013/0254573 A1    Sep. 26, 2013

Related U.S. Application Data

(63) Continuation of application No. 12/259,163, filed on Oct. 27, 2008, now Pat. No. 8,448,004.

(51) Int. Cl.
| | |
|---|---|
| *G06F 1/00* | (2006.01) |
| *G06F 1/32* | (2006.01) |
| *G06F 9/50* | (2006.01) |
| *G06F 3/06* | (2006.01) |

(52) U.S. Cl.
CPC ............ *G06F 1/3221* (2013.01); *G06F 9/5094* (2013.01); *G06F 9/5083* (2013.01); *G06F 3/0635* (2013.01); *Y02B 60/1246* (2013.01); *G06F 9/505* (2013.01); *G06F 3/0625* (2013.01); *Y02B 60/142* (2013.01); *G06F 1/3268* (2013.01); *G06F 3/067* (2013.01)
USPC .......................................... 713/323; 713/324

(58) Field of Classification Search
CPC ... G06F 1/3203; G06F 1/3287; G06F 3/0625; G06F 3/0634; G06F 1/3221; G06F 3/0689; G06F 3/0653; G06F 3/067; Y02B 60/1246; Y02B 60/1278; H04L 67/1097

USPC .................. 711/112, 114; 713/320, 323, 324; 710/33, 38
See application file for complete search history.

(56) References Cited

U.S. PATENT DOCUMENTS

| | | | | |
|---|---|---|---|---|
| 5,666,538 | A  * | 9/1997 | DeNicola ...................... | 713/320 |
| 6,785,826 | B1 * | 8/2004 | Durham et al. ............... | 713/300 |
| 6,993,571 | B2 * | 1/2006 | Kistler .......................... | 709/218 |
| 7,032,125 | B2 * | 4/2006 | Holt et al. .................... | 714/6.12 |

(Continued)

OTHER PUBLICATIONS

VMware. VMware vSphere Metro Storage Cluster Case Study. Technical Marketing Documentation. May 2012.*

(Continued)

*Primary Examiner* — Matthew David
(74) *Attorney, Agent, or Firm* — Perkins Coie LLP (57) ABSTRACT

A system for controlling power usage in a storage cluster by dynamically controlling membership in the storage cluster is disclosed. The storage cluster includes multiple storage servers that provide access to one or more storage subsystems. The power management system uses a power management policy to set parameters for controlling membership in the storage cluster and monitors the storage cluster based on the policy. Based on the monitoring, the system detects when the number of storage servers in the storage cluster should be reduced or increased. To reduce the number, the system selects a storage server to deactivate and directs the selected storage server to migrate storage resources (e.g., data, metadata) associated with the server to a different storage server. The system then deactivates the selected storage server by directing it to transition to a low power mode. The system may increase the number of servers in the storage cluster by reversing these steps.

31 Claims, 7 Drawing Sheets

(56) References Cited

U.S. PATENT DOCUMENTS

| | | | |
|---|---|---|---|
| 7,035,972 B2 | 4/2006 | Guha et al. | |
| 7,043,650 B2* | 5/2006 | Bresniker et al. | 713/324 |
| 7,146,377 B2* | 12/2006 | Nowicki et al. | 1/1 |
| 7,203,846 B2* | 4/2007 | Bresniker et al. | 713/300 |
| 7,210,005 B2 | 4/2007 | Guha et al. | |
| 7,228,369 B2* | 6/2007 | Nakamura | 710/38 |
| 7,260,613 B2* | 8/2007 | Fujimoto | 709/213 |
| 7,266,668 B2 | 9/2007 | Hartung et al. | |
| 7,302,607 B2* | 11/2007 | Gunda et al. | 714/10 |
| 7,318,164 B2* | 1/2008 | Rawson, III | 713/320 |
| 7,330,931 B2 | 2/2008 | Le et al. | |
| 7,340,616 B2* | 3/2008 | Rothman et al. | 713/300 |
| 7,380,060 B2 | 5/2008 | Guha et al. | |
| 7,516,346 B2* | 4/2009 | Pinheiro et al. | 713/324 |
| 7,639,493 B2* | 12/2009 | Hori et al. | 361/679.4 |
| 7,653,784 B2* | 1/2010 | Nakagawa et al. | 711/114 |
| 7,774,630 B2* | 8/2010 | Hatasaki et al. | 713/320 |
| 7,783,909 B2* | 8/2010 | Hatasaki et al. | 713/324 |
| 7,814,351 B2* | 10/2010 | Lubbers et al. | 713/300 |
| 7,908,503 B2* | 3/2011 | Mizuno | 713/324 |
| 8,180,747 B2* | 5/2012 | Marinkovic et al. | 707/704 |
| 2003/0007915 A1 | 1/2003 | Ongaro | |
| 2003/0079151 A1* | 4/2003 | Bohrer et al. | 713/320 |
| 2003/0217246 A1* | 11/2003 | Kubota et al. | 711/170 |
| 2005/0060590 A1* | 3/2005 | Bradley et al. | 713/320 |
| 2005/0210304 A1 | 9/2005 | Hartung et al. | |
| 2006/0282560 A1* | 12/2006 | Bell et al. | 710/33 |
| 2007/0079063 A1* | 4/2007 | Mizuno | 711/112 |
| 2008/0114948 A1 | 5/2008 | Le et al. | |
| 2008/0244290 A1* | 10/2008 | Yoshida et al. | 713/320 |

OTHER PUBLICATIONS

Kushwaha et al. DS8000 Data Migration using Copy Services in Microsoft Windows Cluster Environment. Jul. 2013.*
Gavankar et al. Migrating Failover Clusters to Microsoft Windows Server 2008 on Dell Poweredge Servers. May 2008.*
Notice of Allowance Mailed Jan. 24, 2013 in Co-Pending U.S. Appl. No. 12/259,163 of Kalman, D., filed Oct. 27, 2008.
Qlogic. Data Migration for iSR. Data Sheet. Dec. 2011.
Novell. Simplifying Data Migration through Novell Storage Manager. White Paper. Oct. 2012.
Dell. DELL PowerValult MD3200/MD3220 Series of Storage Arrays. Version 0.96. Jun. 2010.
Non-Final Office Action Mailed Apr. 28, 2011 in Co-Pending U.S. Appl. No. 12/259,163 of Kalman, D., filed Oct. 27, 2008.
Non-Final Office Action Mailed Nov. 16, 2011 in Co-Pending U.S. Appl. No. 12/259,163 of Kalman, D., filed Oct. 27, 2008.
Final Office Action Mailed Mar. 1, 2012 in Co-Pending U.S. Appl. No. 12/259,163 of Kalman, D., filed Oct. 27, 2008.
Non-Final Office Action Mailed Jun. 15, 2012 in Co-Pending U.S. Appl. No. 12/259,163 of Kalman, D., filed Oct. 27, 2008.
Final Office Action Mailed Nov. 16, 2012 in Co-Pending U.S. Appl. No. 12/259,163 of Kalman, D., filed Oct. 27, 2008.
Co-Pending U.S. Appl. No. 12/259,163 of Kalman, D., filed Oct. 27, 2008.

* cited by examiner

POWER SAVINGS USING DYNAMIC STORAGE CLUSTER MEMBERSHIP

This application is a continuation of U.S. patent application Ser. No. 12/259,163, filed on Oct. 27, 2008, which is incorporated herein by reference.

FIELD OF THE INVENTION

Background

In modern computer networks, a storage server can be used for many different purposes, such as to provide multiple users with access to shared data or to back up mission critical data. A file server is an example of a storage server which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID).

One mode in which a file server can be used is a network attached storage (NAS) mode. In a NAS mode, a file server can be implemented in the form of an appliance, sometimes called a filer, that attaches to a network, such as a local area network (LAN) or a corporate intranet. An example of such an appliance is any of the Filer products made by NetApp®, Inc. in Sunnyvale, Calif. A storage server can also be employed in a storage area network (SAN), which is a highly efficient network of interconnected, shared storage devices. In a SAN, the storage server (which may be an appliance) provides a remote host with block-level access to stored data, whereas in a NAS configuration, the storage server provides clients with file-level access to stored data.

The need for data storage is ever growing in today's economy. In order to provide large amounts of storage with high reliability, storage users often add progressively more storage space and more storage servers to a given deployment to ensure that access to the storage is not interrupted. Many storage clusters provide redundancy using multiple storage servers to handle user requests. However, the power demands of these growing storage clusters can become a significant cost for corporations. In addition, many corporations are concerned about the environmental impact of the power used by their storage systems. Prior attempts to reduce power consumption of storage systems include Massive Array of Idle Disks (MAID) systems. A MAID system includes many hard drives that are left idle when unneeded. However, MAID systems suffer from lower latency and throughput compared to other types of storage systems.

DETAILED DESCRIPTION

A system for controlling power usage in a storage cluster by dynamically controlling membership in the storage cluster is disclosed (hereinafter called "the power management system" or "the system"). The storage cluster includes multiple storage servers that provide access to one or more storage subsystems. The power management system uses a power management policy to set parameters for controlling membership in the storage cluster. In some embodiments, the power management policy defines resource usage thresholds such that the system dynamically changes the membership of the storage cluster when resource usage (e.g., CPU usage, client accesses) crosses the defined threshold. The system monitors the storage cluster based on the power management policy. Based on the monitoring, the system detects when the number of storage servers in the storage cluster should be reduced or increased. To reduce the number, the system selects a storage server to deactivate and directs the selected storage server to migrate storage resources (e.g., data, metadata) associated with the server to a different storage server. The system then deactivates the selected storage server by directing it to transition to a low power mode. In some embodiments, the system is configured as N-way backend storage, in which multiple storage servers collectively control access to a single pool of storage space. In this configuration, the system migrates storage resources by transferring metadata associated with the selected storage server and notifying neighboring storage servers to assume its management responsibilities. Alternatively, the system may support a configuration in which storage space is dedicated to individual storage servers. In this configuration, the system also migrates the data associated with the selected storage server. The system may increase the number of servers in the storage cluster by reversing these steps.

Figure 1:
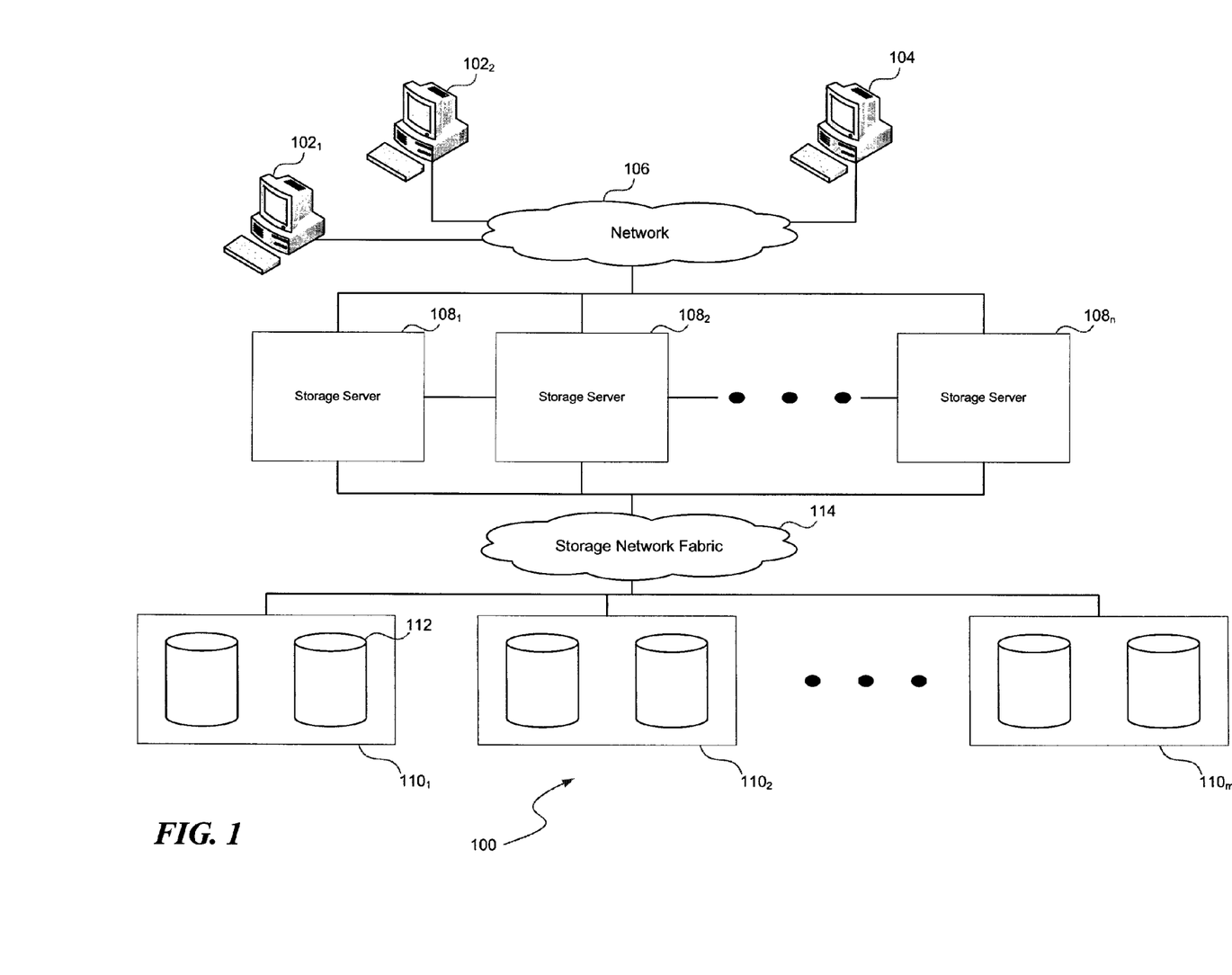
FIG. 1 is a network diagram of an environment in which a power management system operates.

FIG. 1 is a network diagram of an environment 100 in which a power management system operates. The various embodiments described herein are not limited to any particular environment, and may be implemented in various storage systems. In storage clusters having many users, a single storage server may be insufficient to reliably and efficiently support those users, especially during periods of peak use of the storage cluster. In addition, in networks where high reliability is required, a single server does not provide the necessary redundancy in case of a failure. To solve these problems, many storage clusters include multiple storage servers.

In the present illustration, the environment 100 includes multiple storage servers $108_1$ through $108_n$. The storage servers 108 are interconnected and are coupled with multiple mass storage subsystems $110_1$ through $110_m$ through a storage network fabric 114. The mass storage subsystems 110 include sets of mass storage devices 112. The storage servers 108 are also coupled to clients 102 through a network 106, such as a local area network (LAN) or other type of network. Each of the clients 102 may be, for example, a conventional personal computer (PC), workstation, or the like. The storage servers 108 are also coupled to a management server 104, which includes management software configured to allow an administrator to manage the storage servers 108 and the mass storage subsystems 110. The mass storage devices 112 in the mass storage subsystems 110 may be, for example, magnetic disks, optical disks such as compact disks-read only memory (CD-ROM) or digital versatile/video disks (DVD)-based storage, magneto-optical (MO) storage, flash memory, tape-based storage, or any other type of non-volatile storage devices suitable for storing large quantities of data.

The mass storage subsystems 110 are managed by the storage servers 108. For example, the storage servers 108 may receive and respond to various read and write requests from the clients 102, directed to data stored in or to be stored in the storage subsystems 110. In the environment 100 of FIG. 1, the storage cluster is configured as N-way backend storage. In an N-way backend storage configuration, a set of storage servers collectively control access to a common pool of storage. The multiple storage servers 108 enable the network to effectively divide the load of handling data access among all of the servers in the network. For example, a request from a first client $102_1$ for data stored on mass storage subsystem $110_1$ may be handled by storage server $108_1$ while a request from a second client $102_2$ may be handled by storage server $108_n$. In an alternate configuration, individual storage servers 108 are associated with dedicated storage subsystems 110. In this configuration, client requests for data on a particular storage subsystem 110 are always handled by the same storage server 108. Client requests may also be handled by a first server and then routed to a second storage server to access the storage subsystem associated with the request. In many storage clusters, storage servers are managed in pairs, such that one storage server acts as the primary storage server, while the other storage server serves as a redundant backup. The second storage server may also back up its partner while actively serving requests itself.

The storage servers 108 each may have a distributed architecture; for example, each may include separate N-module (network module) and D-module (data module) components (not shown). In such an embodiment, the N-module is used to communicate with the clients 102, while the D-module includes the storage management functionality and is used to communicate with the storage subsystem 110. In another embodiment, the storage servers 108 may have an integrated architecture, where the network and data components are all contained in a single box or unit. The storage servers 108 further may be coupled through a switching fabric to other similar storage systems (not shown) that have their own local storage subsystems. In this way, all of the storage subsystems can form a single storage pool, to which any client of any of the storage systems has access.

Figure 2:
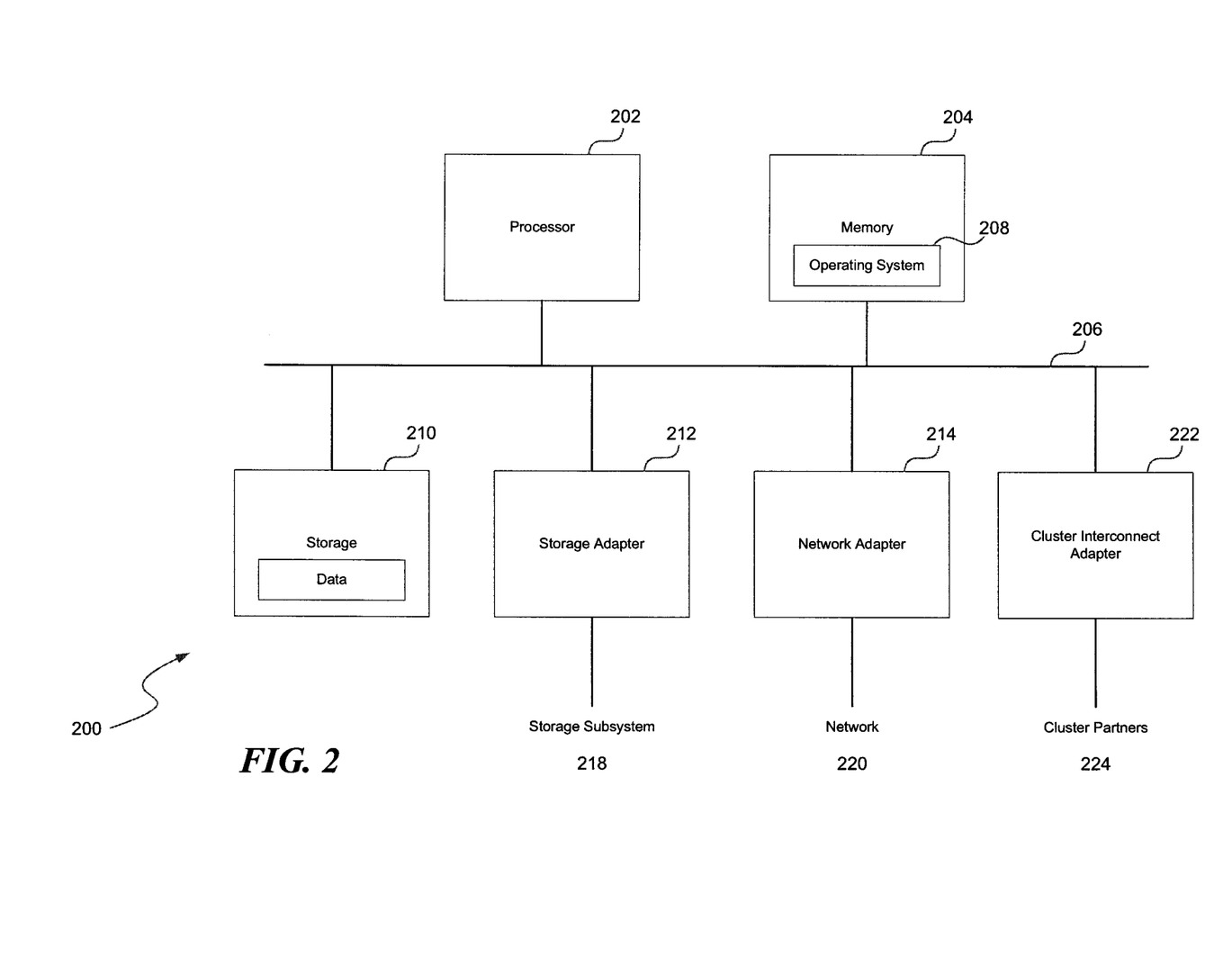
FIG. 2 is a high-level block diagram showing an example of the architecture of a storage server.

FIG. 2 is a high-level block diagram showing an example of the architecture of a storage server 200. The storage server 200 may represent any of the storage servers 108 of FIG. 1.

The storage server 200 includes one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 202 may include central processing units (CPUs) of the storage server 200 and, thus, control the overall operation of the storage server 200. In certain embodiments, the processor(s) 202 accomplish this by executing software or firmware stored in memory 204. The processor(s) 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 204 is or includes the main memory of the storage server 200. The memory 204 represents any form of random access memory (RAM), read-only memory (ROM), flash memory, or the like, or a combination of such devices. In use, the memory 204 stores, among other things, the operating system 208 of the storage server 200.

A storage adapter 212, a network adapter 214, and a cluster interconnect adapter 222 are also connected to the processor(s) 202 through the interconnect 206. The storage adapter 212 allows the storage server 200 to access a storage subsystem 218 and may be, for example, a Fibre Channel adapter or a SCSI adapter. The cluster interconnect adapter 222 provides a high-speed connection to clusters partners 224, i.e., the other storage servers in a storage cluster having multiple storage servers. The cluster interconnect adapter 222 could be, e.g., Infiniband or Ethernet. The network adapter 214 provides the storage server 200 with the ability to communicate with remote devices, such as clients, over a network 220 and may be, for example, an Ethernet adapter. The storage server 200 may further include local storage 210 coupled to the interconnect 206.

The clients 102 and the management server 104 could be implemented using at least some of the same components. For example, the clients 102 and the management server 104 also include a processor 202 and a memory 204 configured to store an operating system 208. The components are connected using an interconnect 206, such as a PCI bus or other system interconnection. The clients 102 and the management server 104 also include a storage component 210, such as a hard drive or solid-state storage device, and a network adapter 214, as well as I/O devices (not shown).

Figure 3:
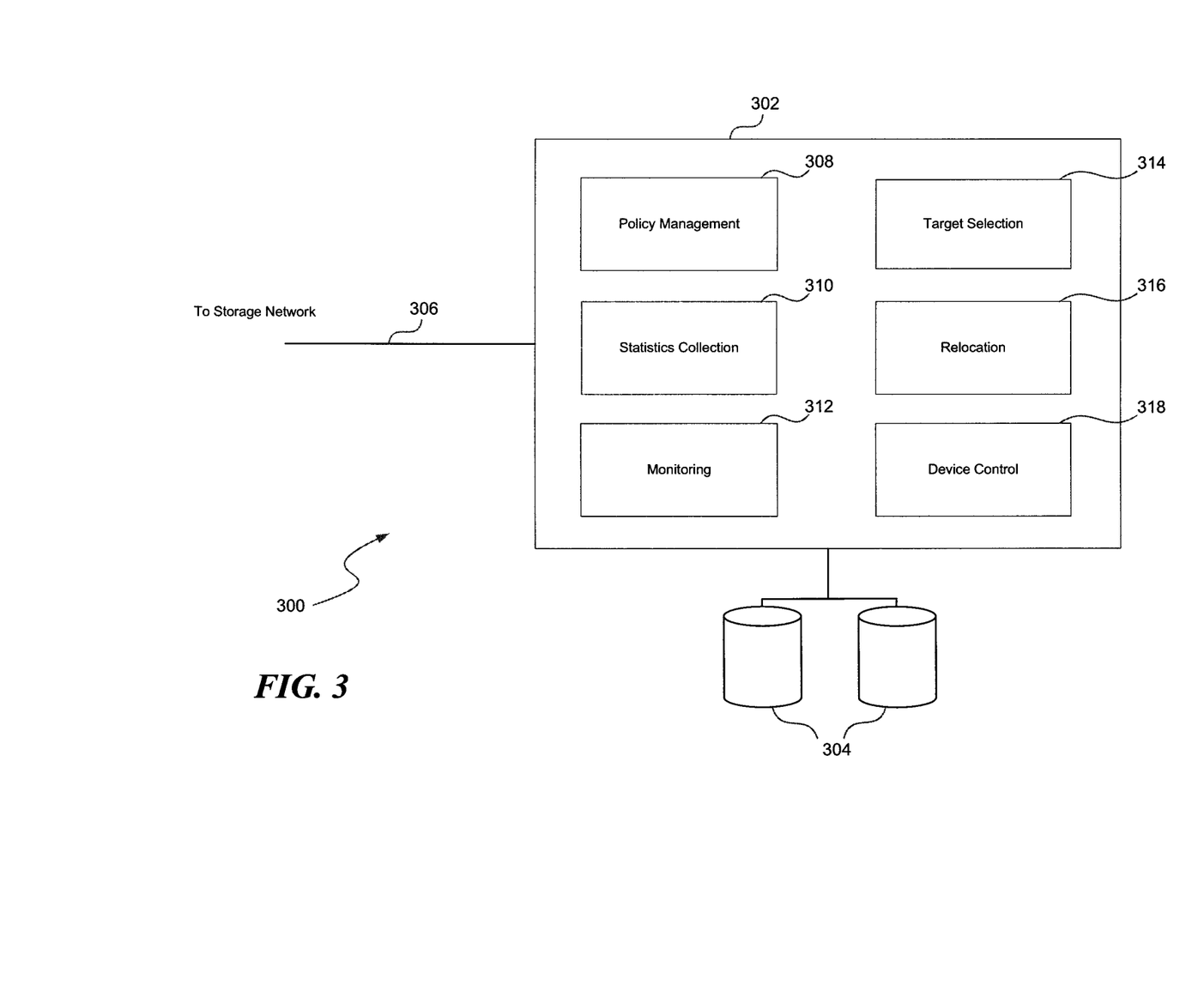
FIG. 3 is a logical block diagram of the power management system.

FIG. 3 is a logical block diagram of the power management system 300. Aspects of the system 300 may be implemented as software, firmware, hardware, or as a combination of these. The system 300 may reside, for example, on a management server such as the management server 104 in FIG. 1. Alternatively, the system 300 may reside on one of the storage servers 108. If the system 300 operates on a storage server, the system may be configured so that the storage server being used will never be deactivated. Alternatively, the system 300 may be configured to transfer the its processing to a different storage server 108 if it determines that the current storage server 108 should be shut down. The system 300 may also be contained on a client 102. As will be described in additional detail herein, the system 300 includes a number of modules to facilitate the functions of the system. Although the various modules are described as residing in a single server, the modules are not necessarily physically co-located. In some embodiments, the various modules could be distributed over multiple physical devices and the functionality implemented by the modules may be provided by calls to remote services. Similarly, the data storage area could be local storage or remote storage, and distributed in one or more physical devices. Assuming a software or firmware implementation, the code to support the functionality of this system may be stored on a computer-readable medium such as an optical drive, flash memory, or a hard drive.

The system 300 includes a processing component 302, which is configured to monitor the storage cluster and manage network membership. The processing component 302 is connected to a storage component 304, which stores configuration and settings information used by the processing component 302. In particular, the storage component 304 may store the power management policy. The processing component 302 also has a data connection 306 to the storage cluster. The data connection 306 may be provided through any suitable hardware component. For example, the system 300 may use a network adapter 214 such as used in the computer system 200 shown in FIG. 2.

The processing module 302 includes a policy management component 308, which loads, stores, and manages the power management policy for the system. The policy management component 308 interacts with the storage component 304 to load the power management policy and interacts with an input component of the system (not shown) to receive a new power management policy or to modify an existing power management policy. A new power management policy may be input by a user (e.g., network administrator) or loaded from another system. The policy management component 308 also interacts with other components of the processing component 302 in order to enable the monitoring and membership management functions of the system 300.

The processing component 302 includes a statistics collection component 310, which is configured to gather usage statistics from the storage servers 108 in the storage cluster. In one embodiment, the statistics collection component 310 periodically queries the storage servers 108 for various operational parameters to obtain the usage statistics. Alternatively, the system may be configured to have the storage servers 108 automatically provide the usage statistics. The usage statistics may include data about CPU usage or storage activity (e.g., number of requests handled, amount of data transferred). The processing component 302 also includes a monitoring component 312, which is configured to monitor the storage servers 108 in the storage cluster based on the power management policy. The monitoring component compares the usage statistics gathered by the statistics collection component 310 to the power management policy to detect when the membership in the storage cluster should be changed. When the monitoring component 312 determines that membership in the storage cluster should be changed, it generates an event to notify the target selection component 314.

The processing component 302 also includes a target selection component 314, which is configured to respond to the event from the monitoring component 312 indicating membership should be changed. After receiving the event, the target selection component 314 analyzes the storage cluster and selects one or more storage servers 108 to activate or deactivate. The storage servers may be selected based on criteria such as power usage or processing cost to activate or deactivate the server, as discussed further below.

The processing component 302 also includes a relocation component 316, which is configured to manage the process of relocating resources between storage servers in the storage cluster. When the system 300 deactivates a storage server 108, it must also relocate resources associated with the storage server, so that users do not perceive a change in service. The resources may be metadata relating to the storage cluster (e.g., in an N-way backend storage configuration) and may also include data managed by the storage server. The metadata to be relocated may include, for example client access control lists and storage policies. When a storage server 108 is activated, the process is reversed, as the system moves resources to the storage server 108.

The processing component 302 also includes a device control component 318, which is configured to activate or deactivate storage servers in the storage cluster. In one implementation, the device control component 318 communicates with power control software on individual storage servers 108 and directs the power control software to deactivate the storage server 108 being targeted. The storage servers 108 may also be configured with Wake on LAN (WOL) functionality. In this configuration, storage servers that were previously deactivated may be reactivated by sending a wake packet to the target storage server. Deactivating a storage server may include transitioning the target storage server to a sleep mode or to a powered-down state. The device control component 318 may also be configured to communicate directly with the power supplies or power sources of the storage servers in the storage cluster. In this configuration, the device control component 318 may send a first deactivate command to the target storage server (to inform it that it will be deactivated) and a second deactivate command to the power supply controller associated with that storage server (directing the power supply to stop providing power).

Figure 4A:
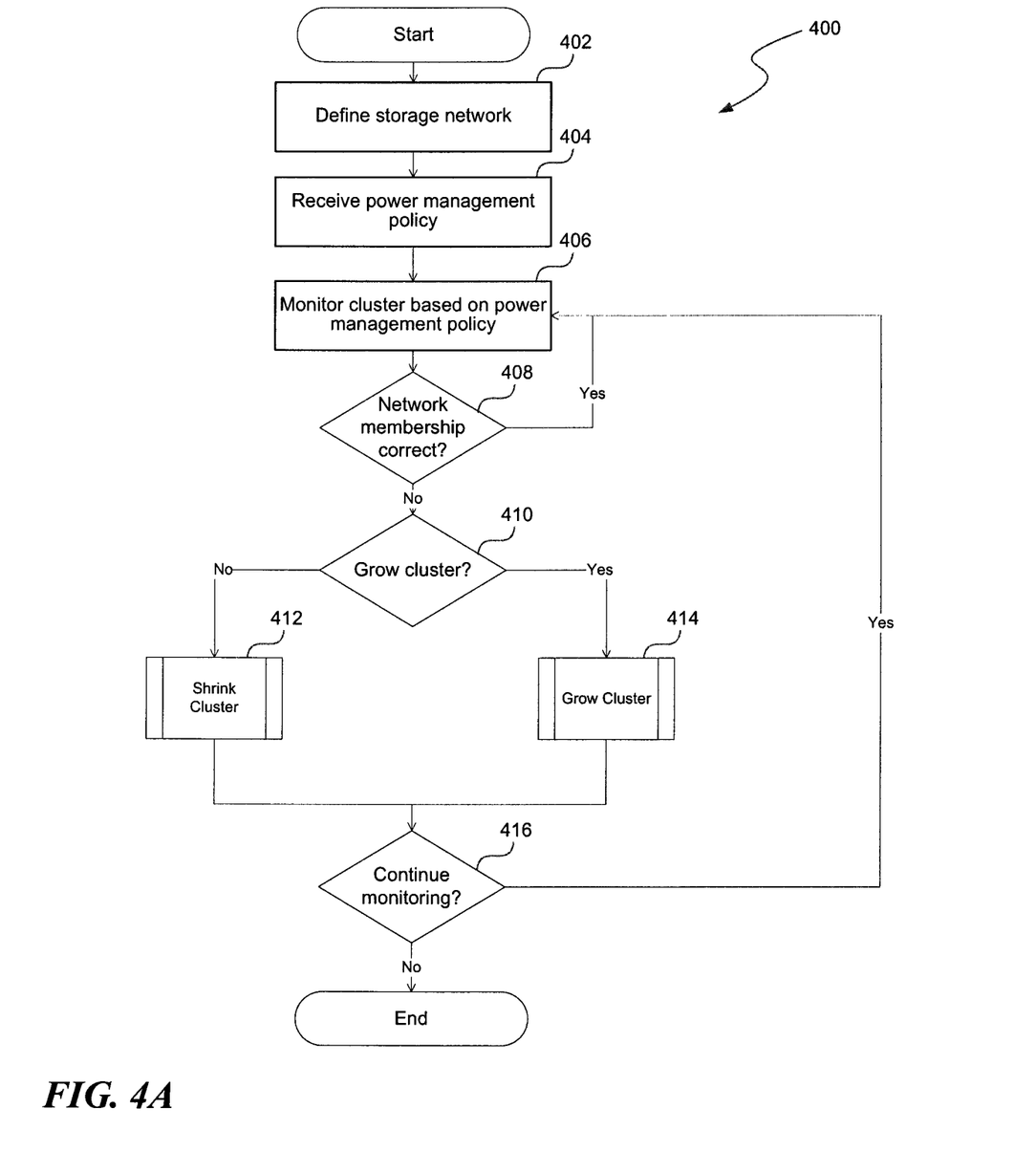
FIG. 4A is a flowchart of a process for managing the storage cluster according to the power management system.

FIG. 4A is a flowchart of a process 400 for managing the storage cluster according to the power management system. The process begins at block 402 where the storage cluster is defined. Defining the storage cluster includes defining relationships between the storage servers and storage devices in the system and otherwise configuring the network (e.g., configuring network settings to enable clients 102 to access the storage). Some or all of this configuration information may be provided to the power management system. Alternatively, the power management system may use network discovery methods, such as Simple Network Management Protocol (SNMP), to automatically discover the storage cluster's configuration. The configuration information may include the type of backend storage (i.e., N-way backend or dedicated) used in the storage cluster. After the storage cluster has been defined, the process proceeds to block 404, where it receives the power management policy. The power management policy may be received from a user or an existing power management policy may be loaded from the storage component 304. If a policy does not already exist, the system may use a default policy. As discussed below, the power management policy may include one or more parameters for defining membership in the storage cluster.

After the power management policy is received, the process proceeds to block 406, where it monitors the storage cluster based on the power management policy. The monitoring may include gathering statistics from the storage servers 108. The process then proceeds to decision block 408, where it determines if the current network membership is correct based on monitoring. In general, the power management policy provides parameters that define membership based on time or performance. For example, the power management policy may be set to change membership in the storage cluster based on the current time of day. In this configuration, the power management policy could be defined to provide for maximum redundancy in the storage cluster during high usage times (e.g., regular business hours) and reduce the number of active storage servers during low usage times (e.g., the middle of the night).

The storage policy may also be performance based. In this configuration, the monitoring component 312 uses information about activity of the storage servers 108 to determine network membership. For example, a performance-based management policy may include parameters for monitoring CPU activity in individual storage servers 108. If CPU activity in a storage server being monitored falls below a specified threshold, the system could designate the storage server 108 as a candidate for deactivating. Alternatively, the system may monitor aggregate CPU usage for all storage servers 108 in the storage cluster. The system could then compare the aggregate CPU usage to a CPU threshold in the power management policy and determine based on the comparison that a storage server within the storage cluster should be deactivated. The power management policy may also define threshold levels of storage activity (e.g., number of requests handled by a server, amount of data transferred by a server) to be monitored. Then, the system may determine that a storage server should be deactivated if the number of requests or the amount of data transferred falls below the threshold. As with the CPU usage threshold, the storage activity threshold may be defined for an individual server or as an aggregate value for the storage cluster.

If the monitoring component 312 determined in decision block 408 that the network membership is correct, the process returns to block 406, where it continues monitoring the network based on the power management policy. This loop continues until the monitoring component 312 detects that the network membership should be changed.

If the monitoring component 312 determined in decision block 408 that network membership is incorrect, the process proceeds to decision block 410, where it determines whether the monitoring indicates that the network should grow or shrink. This determination is also based on the power management policy. The policy is generally defined to indicate the type of change called for when membership should be changed. For example, if CPU usage falls below a minimum value, the system will determine that a storage server should be deactivated. Similarly, if usage rises above a maximum value, the system will activate one or more inactive servers. If the system determines that the network should shrink, processing proceeds to block 412, where the system carries out the steps necessary to shrink the storage cluster. Similarly, if the system determines that the network should grow, processing proceeds to processing block 414, where the system executes the steps to grow the network by adding one or more additional servers. These steps to reconfigure the storage cluster are described below with reference to FIG. 4B.

After the modifying the network, the process proceeds to decision block 416, where it determines whether to continue monitoring the storage cluster based, for example, on user input or system configuration. If it is determined to continue monitoring, the process returns to block 406 and continues monitoring the storage cluster based on the power management policy. Otherwise, the process terminates the monitoring process.

Figure 4B:
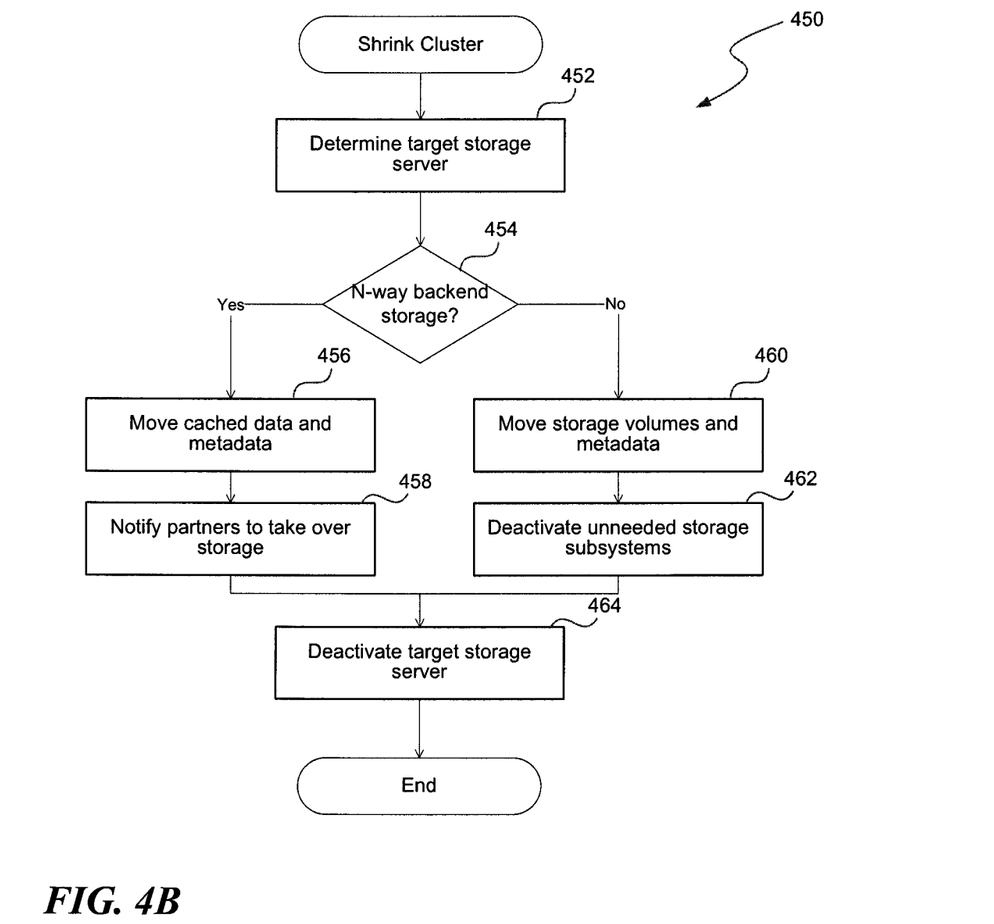
FIG. 4B is a flowchart of process for shrinking the storage cluster according to the power management system.

FIG. 4B is a flowchart of process 450 for shrinking the storage cluster. Processing begins in block 452, where the system determines a target storage server for deactivation. The target storage server may be chosen randomly or selected based on a selection algorithm. For example, if the storage servers in the storage cluster have heterogeneous hardware, the system may be configured to deactivate a storage server that uses more power during operation. Power usage data may be gathered from the storage servers by the statistics collection component 310 for use by the target selection component 314. Alternatively, the system may be configured to select the target storage server based on the amount of resources that would have to be migrated when deactivating the individual server. In this implementation, the system may evaluate the resources (e.g., data, metadata) that would be moved if an individual storage server is deactivated. The system could then reduce the load on the network by deactivating a storage server that requires fewer resources to be moved. The system may also determine a target storage server based on the type of resources that must be transferred. For example, the system may favor deactivating a storage server where only metadata needs to be transferred, rather than a storage server that has data to be transferred as well.

During the target-selection process, the system may also consider the need to maintain redundancy within the storage cluster. Thus, the system may be configured to ensure that a specified minimum number of storage servers are active at all times. In some storage clusters, every storage server is configured with a dedicated backup server. In this configuration, the system may be configured to activate and deactivate storage servers in pairs, rather than individually.

After selecting a target storage server to deactivate, the process proceeds to decision block 454, where it determines if the storage cluster being managed uses N-way backend storage. As discussed above, the type of data to be moved differs depending on whether the network is configured with dedicated storage or with N-way backend storage. The system may determine the type of storage using data received during the initial network configuration.

If the storage cluster is configured as N-way backend storage, the process proceeds to block 456, where the relocation component 316 moves cached data and metadata associated with the target storage server to other storage servers in the storage cluster. In some storage clusters, metadata is shared between all storage servers in the cluster. In this implementation, the system does not migrate the metadata. The system may also be configured to flush the cache, rather than relocating the cached data. After the relocation component 316 has moved cached data and metadata to other storage servers in the network, the process proceeds to block 458, where it notifies partners in the storage cluster that the target storage server will be removed from the network. This enables the partner storage servers to begin to handle storage requests that previously passed through the target storage server. The system also notifies the target storage server to stop handling requests.

If the storage cluster is not configured as N-way backend storage, the process proceeds to block 460, where it moves data and metadata associated with the target storage server. Because storage servers in this type of network have dedicated storage, the system moves the data in the dedicated storage to other storage locations within the storage cluster to ensure that users can continue to access the data. This may include migrating logical configuration, such as logical volumes, to the other storage locations. After the storage volumes and metadata have been moved, the process proceeds to block 462, where it deactivates unneeded storage subsystems. Because the storage subsystems are dedicated to serving particular storage servers, there is no need to maintain the devices in an active mode when the associated storage server has been deactivated. Thus, after the storage server has been deactivated, the system deactivates the associated storage subsystems.

After the data has been migrated and partner nodes notified, the process proceeds to block 464, where it deactivates the target storage server. As discussed above, deactivating refers to transitioning the storage server into a lower power mode. The lower power mode may include a sleep mode, such that the storage server can be easily restored to full power.

Similar steps are executed to grow the network. However, the steps are generally carried out in the reverse order. Thus, in growing the network, the system first determines a target storage server to activate. Once the target storage server has been selected, the system activates the server. The system then directs that data be migrated to the newly activated storage server nodes. In an N-way backend storage system, the system migrates the necessary metadata. In a dedicated storage system, the system migrates both metadata and storage data and may also activate storage subsystems associated with the newly activated storage server.

Figure 5A:
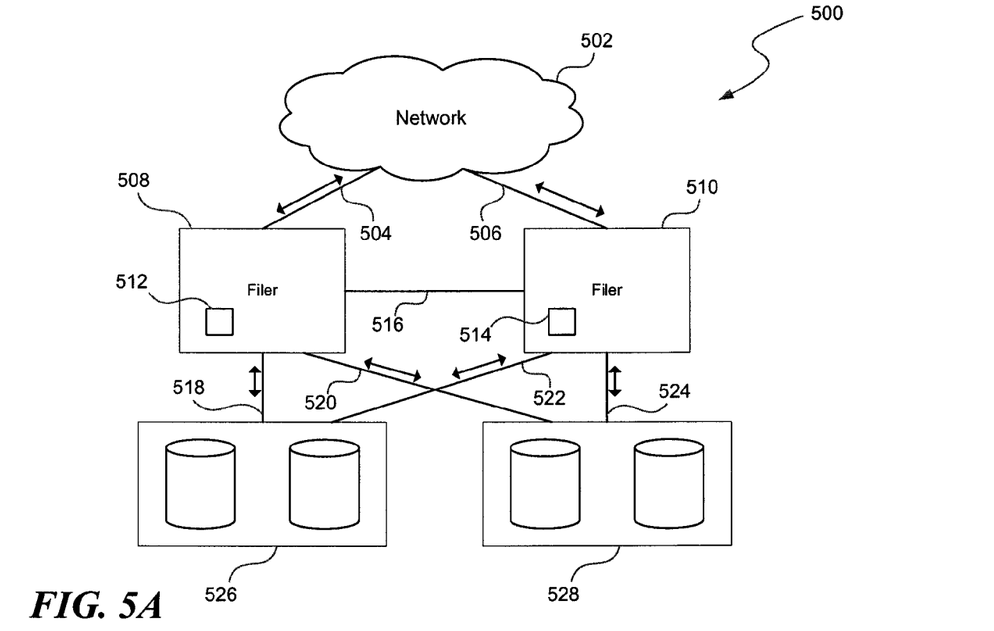
FIG. 5A is an initial configuration of a storage cluster having two active storage servers that manage access to two mass storage subsystems.
Figure 5B:
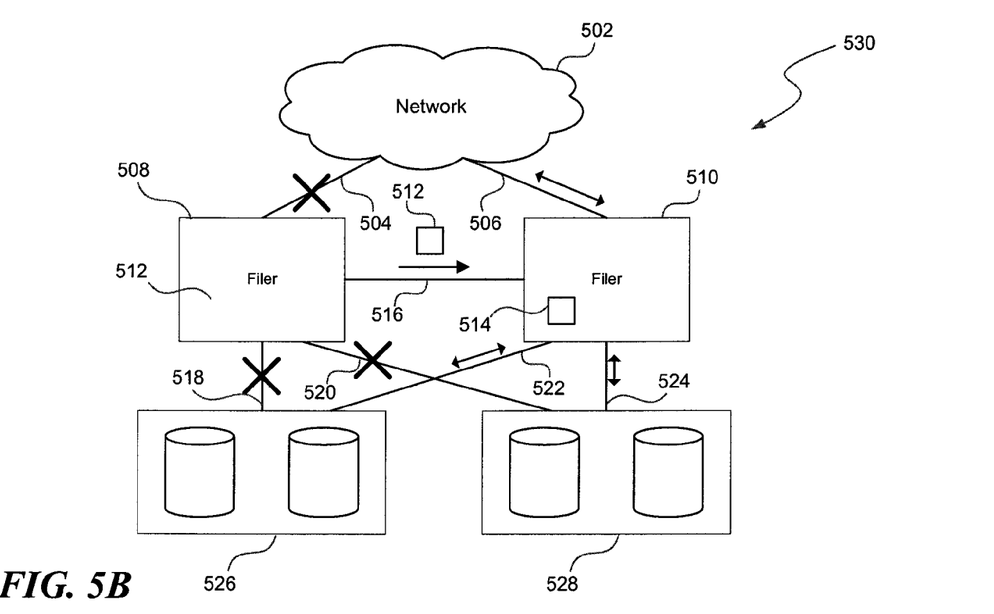
FIG. 5B is an intermediate configuration of the storage cluster where the power management system has determined that a storage server should be deactivated.
Figure 5C:
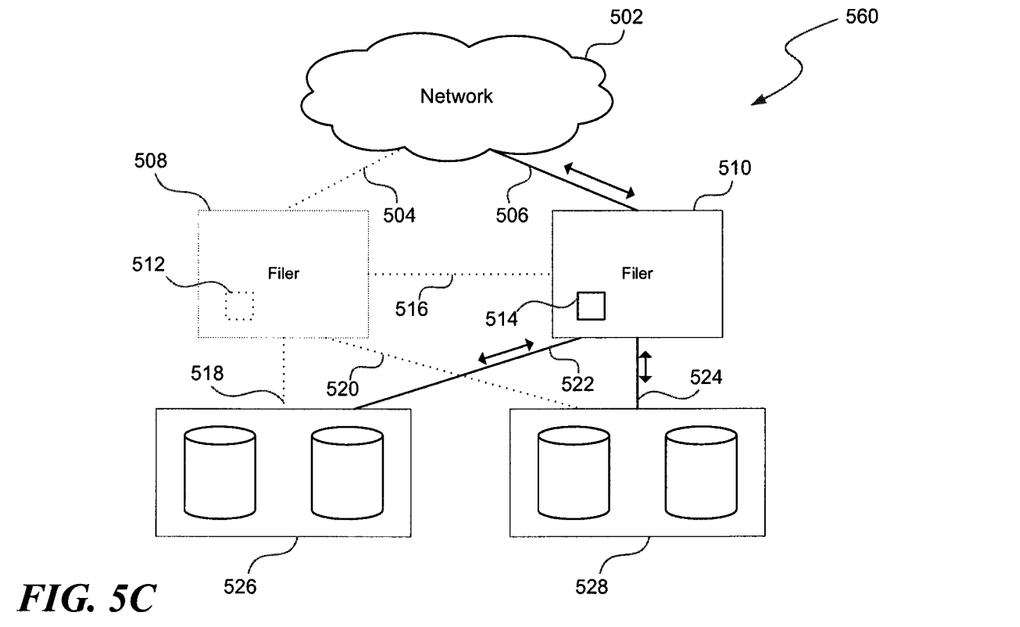
FIG. 5C is a final configuration of the storage cluster where the storage server 508 has been deactivated.

FIGS. 5A through 5C illustrate the changing configuration in a simple storage cluster when a storage server is deactivated according to an embodiment of the power management system. For simplicity, the storage cluster in FIGS. 5A through 5C is shown with only two storage servers. However, the process discussed below could be implemented in a storage cluster having an arbitrary number of storage servers. In general, storage clusters using the power management system will include more than two storage servers in order to provide sufficient redundancy after a server is deactivated. The storage cluster shown in FIGS. 5A through 5C is configured with N-way backend storage, but a similar process could be used for a storage cluster having dedicated storage.

FIG. 5A is an initial configuration 500 of a storage cluster having two active storage servers that manage access to two mass storage subsystems. The storage cluster is accessed through a network 502, which is connected to one or more client systems (not shown). Storage requests received through the network 502 are passed to storage server 508 through data link 504 or to storage server 510 through data link 506. Storage server 508 and storage server 510 are interconnected through a cluster interconnect link 516. Storage server 508 stores metadata 512, while storage server 510 stores metadata 514. The storage cluster also includes storage subsystem 526 and storage subsystem 528. The storage server 508 is connected to storage subsystem 526 through link 518 and to storage subsystem 528 through link 520. Similarly, storage server 510 is connected to storage subsystem 526 through link 522 and to storage subsystem 528 through link 524. The links shown in FIGS. 5A through 5C may be of any type well known in the art to interconnect storage cluster components, such as Ethernet, Fibre Channel, or InfiniBand.

FIG. 5B is an intermediate configuration 630 of the network in which the power management system has determined that a storage server should be deactivated. In this configuration, data no longer flows to or from the storage server 508 (as indicated by Xs over links 504, 518, and 520), although the storage server 508 remains active. At the same time that data traffic to storage server 508 stops, the storage cluster transfers metadata 512 from storage server 508 to storage server 510 using the cluster interconnect link 516. During this process, storage server 510 remains active and data flows through the links 506, 522, and 524. Thus, the storage cluster continues to provide a connection between the network 502 and the storage subsystems 526 and 528.

FIG. 5C is a final configuration 660 of the network where the storage server 508 has been deactivated. After the metadata 512 has been transferred from the storage server 508 to the storage server 510, the storage server 508 is deactivated (as indicated by the dotted lines for the storage server 508 in FIG. 5C). The links connected to the storage server 508, including links 504, 518, and 520, and cluster interconnect link 516, are all inactive, so that no data flows along those links. However, as with the intermediate configuration 630, the storage server 510 remains active to provide access to the storage subsystems 526 and 528.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method for managing storage cluster membership, the method comprising:
   accessing a power management policy for determining membership in a storage cluster, the storage cluster comprising a plurality of storage servers as members of the storage cluster, each member including a cluster interconnect adapter to communicate with other storage servers of the storage cluster, and a plurality of storage devices, wherein the plurality of storage servers manage access to the plurality of storage devices and each storage server of the plurality of storage servers can operate in a first mode and a second mode, such that power consumption of an individual storage server operating in the first mode differs from the power consumption of the individual storage server operating in the second mode;
   monitoring the storage cluster based on the power management policy;
   based on the monitoring, selecting a first storage server to transition from the first mode to the second mode;
   migrating resources between the selected first storage server and a second storage server in the plurality of storage servers via the respective cluster interconnect adapters of the selected first storage server and the second storage server; and
   transitioning the selected first storage server to the second mode.

2. The method of claim 1, wherein the first mode is an active mode, the second mode is an inactive mode, and wherein migrating resources comprises migrating resources from the first server to the second server.

3. The method of claim 1, wherein the first mode is an inactive mode, the second mode is an active mode, and wherein migrating resources comprises migrating resources from the second server to the first server.

4. The method of claim 1, wherein transitioning the selected first storage server further comprises transitioning a storage device associated with the first storage server to an inactive mode.

5. The method of claim 1, wherein the power management policy defines membership in the network based on a threshold amount of storage activity, monitoring the storage cluster comprises comparing storage activity handled by an individual storage server of the plurality of storage servers to the threshold amount, and selecting a first storage server comprises selecting a storage server that has an amount of storage activity below the threshold amount of storage activity.

6. The method of claim 1, wherein the power management policy defines membership in the network based on a threshold aggregate processing load and wherein monitoring the storage cluster comprises comparing an aggregate processing load of the storage cluster to the threshold aggregate processing load.

7. The method of claim 1, wherein migrating resources comprises copying data between individual storage devices of the plurality of storage devices.

8. The method of claim 1, wherein migrating resources comprises copying metadata associated with the first storage server to the second storage server.

9. The method of claim 1, wherein selecting a first storage server comprises:
   determining power usage of individual storage servers of the plurality of storage servers; and
   selecting the first storage server based on the determined power usage.

10. The method of claim 1, wherein selecting a first storage server comprises:
    determining resources to be migrated from individual storage servers of the plurality of storage servers; and
    selecting the first storage server based on the type of resources to be migrated.

11. The method of claim 1, wherein selecting a first storage server comprises:
determining resources to be migrated from individual storage servers of the plurality of storage servers; and
selecting the first storage server based on the quantity of resources to be migrated.

12. A system for managing storage cluster membership, the system comprising:
a storage component configured to store a power management policy for determining membership in a storage cluster, the storage cluster comprising a plurality of storage servers as members of the storage cluster, each of the storage servers including a cluster interface to communicate with at least another member of the storage cluster, and a plurality of storage devices, wherein the plurality of storage servers manage access to the plurality of storage devices and individual storage servers of the plurality of storage servers can operate in an active mode and an inactive mode;
a monitoring component configured to monitor the storage cluster based on the power management policy;
a target selection component configured to select a first storage server to remove from the network based on the monitoring;
a re-location component configured to cause the first storage server to migrate resources associated with the first storage server directly to a second server in the plurality of storage servers via respective cluster interconnect adapters of the first storage server and the second server; and
a device control component configured to transition the first storage server to the inactive mode.

13. The system of claim 12, wherein the power management policy defines membership in the network based on one or more time periods.

14. The system of claim 12, wherein:
the power management policy defines membership in the network based on a threshold processing load,
the monitor component monitors the storage cluster by comparing processing load of an individual storage server of the plurality of storage servers to the threshold processing load, and
the target selection component selects the first storage server by selecting a storage server that has a processing load below the threshold processing load.

15. The system of claim 12, wherein:
the target selection component is further configured to select a third storage server to add to the network based on the monitoring, wherein the third storage server is in the inactive mode; and
the device control component is further configured to transition the third storage server from the inactive mode to the active mode.

16. The system of claim 12, wherein the target selection component selects the first storage server by:
determining resources to be migrated from individual storage servers of the plurality of storage servers; and
selecting the first storage server based on the quantity of resources to be migrated.

17. The system of claim 12, wherein the monitoring component is located on a storage server in the plurality of storage servers.

18. The system of claim 12, wherein the monitoring component is located on a device separate from the storage cluster.

19. A system for managing storage cluster membership, the system comprising:
a storage cluster comprising:
a plurality of storage devices; and
a plurality of storage servers as members of the storage cluster capable of operating in an active mode and an inactive mode, each member including a cluster interconnect adapter to communicate with at least another member of the storage cluster,
wherein the plurality of storage servers manage access to the plurality of storage devices; and
a management server configured to:
access a power management policy for determining membership in a storage cluster;
monitor the storage cluster based on the power management policy; and
dynamically modify storage server membership in the storage cluster based on the monitoring,
wherein, in response to modifying the storage server membership, at least two of the storage servers transfer data or metadata between each other via the respective cluster interconnect adapters of the at least two storage servers.

20. The system of claim 19, wherein the management server is further configured to dynamically modify storage server membership in the storage cluster by at least:
selecting a first storage server to remove from the network based on the monitoring;
re-locating resources associated with the first storage server to a second server in the plurality of storage servers; and
transitioning the first storage server to the inactive mode.

21. The system of claim 19, wherein the management server is further configured to dynamically modify storage server membership by at least transitioning a storage server to an inactive mode.

22. The system of claim 19, wherein the power management policy defines membership in the network based on one or more specified time periods.

23. The system of claim 19, wherein:
the power management policy defines membership in the network based on a threshold processing load,
monitoring the storage cluster comprises comparing a processing load of an individual storage server of the plurality of storage servers to the threshold processing load, and
dynamically modifying storage server membership comprises transitioning a storage server that has a processing load below the threshold processing load to an inactive state.

24. The system of claim 19, wherein the power management policy defines membership in the network based on a threshold aggregate processing load and wherein monitoring the storage cluster comprises comparing an aggregate processing load of the storage cluster to the threshold aggregate processing load.

25. The system of claim 19, wherein modifying storage server membership in the storage cluster includes ensuring a specified level of redundancy in the storage cluster.

26. A machine-implemented method comprising:
operating a storage cluster that includes a plurality of storage servers as members of the storage cluster that control data storage in a plurality of mass storage devices, wherein each member of the storage cluster includes a cluster interconnect interface to communicate with other members of the storage cluster; and reducing power consumption in the storage cluster by dynamically modifying storage server membership in the storage cluster, wherein dynamically modifying the storage server membership includes transferring data or metadata between at least two of the storage servers directly via the respective cluster interconnect adapters of the storage servers.

27. The method of claim 26, wherein dynamically modifying storage server membership comprises reducing membership in the storage cluster by transitioning a storage server in the network from an active mode to an inactive mode.

28. The method of claim 26, wherein dynamically modifying storage server membership in the storage cluster is based on a user-defined policy.

29. The method of claim 26, wherein dynamically modifying storage server membership in the storage cluster is based on a usage tracking algorithm.

30. The method of claim 26, wherein dynamically modifying storage server membership in the storage cluster is based on specified time periods.

31. The method of claim 26, wherein dynamically modifying storage server membership in the storage cluster comprises:

during a first time period, transitioning a storage server in the network from an active mode to an inactive mode; and during a second time period, transitioning the storage server from the inactive mode to the active mode.

* * * * *